United States Patent [19]

Hirohata

[11] Patent Number: 4,802,804
[45] Date of Patent: Feb. 7, 1989

[54] PLASTIC CLIP WITH RESILIENT THREAD SEGMENTS AND HINGED CLASP

[75] Inventor: Toshio Hirohata, Yokohama, Japan
[73] Assignee: Nifco Inc., Yokohama, Japan
[21] Appl. No.: 189,783
[22] Filed: May 3, 1988
[30] Foreign Application Priority Data
  May 11, 1987 [JP] Japan ................... 62-112583
[51] Int. Cl.$^4$ ............................................. F16B 37/08
[52] U.S. Cl. ................... 411/433; 411/437; 411/908
[58] Field of Search ............... 411/432, 433, 437, 512, 411/907, 908, 991–993, 995; 24/136 L, 573, 590

[56] References Cited

U.S. PATENT DOCUMENTS

| | | | |
|---|---|---|---|
| 1,879,421 | 9/1932 | Nalle | 411/433 X |
| 2,736,227 | 2/1956 | Stroble | 411/433 |
| 4,676,706 | 6/1987 | Inaba | 411/432 X |

FOREIGN PATENT DOCUMENTS

| | | | |
|---|---|---|---|
| 45-30852 | 10/1970 | Japan | 411/433 |
| 228390 | 6/1969 | U.S.S.R. | 411/433 |

Primary Examiner—Gary L. Smith
Assistant Examiner—Douglas E. Ringel
Attorney, Agent, or Firm—Trexler, Bushnell, Giangiorgi & Blackstone

[57] ABSTRACT

A plastic clip to be tightened against a bolt comprises a base having a through hole to be penetrated vertically by the bolt, an upright post extending upright from the top of the base adjacent to the through hole, a cylindrical portion united to the outer end of the upright post and having a hole formed above and coaxial with the through hole in the base for receiving the bolt, a pair of flexible arms one extending in a curved fashion from each side of the upright post betwen the base and the cylindrical portion to slightly project with respect to the outer shape of the cylindrical portion and having a curved concave inner surface provided with a thread to be meshed with the male thread of the bolt, and a bifurcated pivotable member vertically rockably united via a reduced thickness hinge portion to the outer periphery of the cylindrical member, the bifurcated pivotable member serving to urge the pair of flexible arms sidewise against the bolt when rocked downwards.

2 Claims, 2 Drawing Sheets

PLASTIC CLIP WITH RESILIENT THREAD SEGMENTS AND HINGED CLASP

BACKGROUND OF THE INVENTION

1. Field of the Invention

This invention relates to a plastic clip to be tightened against a bolt for securing a work to the bolt.

2. Prior Art Statement

Plastic clips like that noted above are disclosed in Japanese Patent Public Disclosure SHO No. 52-60369, Japanese Patent Public Disclosure SHO No. 61-2912, Japanese Patent Public Disclosure SHO No. 61-59012, Japanese Utility Model Public Disclosure SHO No. 59-81872 and Japanese Utility Model Public Disclosure SHO No. 61-52710.

Each of these prior-art clips is fitted on and pushedly tightened against a bolt. However, a great force is required for tightening the bolt by pushing. Further, to remove the clip once mounted on the bolt, the clip has to be turned like a nut. Therefore, the removal of the clip is rather cumbersome.

OBJECT AND SUMMARY OF THE INVENTION

An object of the invention is to provide a plastic clip, which can be smoothly tightened against a bolt meeting minimal resistance and can be readily removed from the bolt.

According to the invention, there is provided a plastic clip to be tightened against a bolt, which comprises a base having a through hole to be penetrated vertically by the bolt, an upright post extending upright from the top of the base adjacent to the through hole, a cylindrical portion united to the outer end of the upright post and having a hole formed above and coaxial with the through hole in the base for receiving the bolt, a pair of flexible arms one extending in a curved fashion from each side of the upright post between the base and the cylindrical portion to slightly project with respect to the outer shape of the cylindrical portion and having a curved concave inner surface provided with a thread to be meshed with the male thread of the bolt, and a bifurcated pivotable member vertically rockably united via a reduced thickness hinge portion to the outer periphery of the cylindrical member, the bifurcated pivotable member serving to urge the pair of flexible arms sidewise against the bolt when rocked downwards.

To tighten the clip having the above construction against a bolt, the through hole of the base and hole of the cylindrical portion are fitted on the bolt. At this time, the threads on the pair of flexible arms can be readily fitted on the bolt since the threads on the pair of flexible arms are not yet in contact with the bolt. Subsequently, the bifurcated pivotable member is rocked downwards and brought into frictional contact with the pair of flexible arms to cause inward flexing of the flexible arms so as to mesh the threads on the curved inner surface of the flexible arms sidewise with the male thread of the bolt. In this way, the clip is tightened against the bolt.

To remove the clip from the bolt, the bifurcated pivotable member is rocked upwards to be separated from the pair of flexible arms. As a result, the flexible arms outwardly flex by their own elasticity to release the mesh between their threads and the bolt. Now, the clip can be readily removed from the bolt.

The above and other objects and features of the invention will become more apparent from the following detailed description with reference to the accompanying drawings.

DETAILED DESCRIPTION OF THE PREFERRED EMBODIMENT

Figure 1:
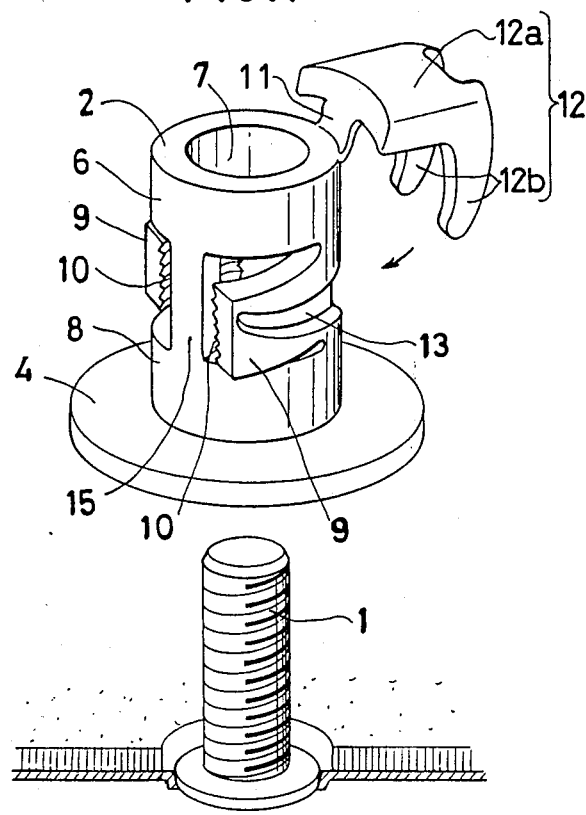
FIG. 1 is a perspective view showing an embodiment of the plastic clip according to the invention.
Figure 2:
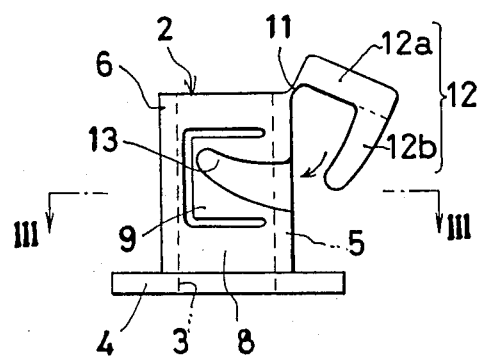
FIG. 2 is a side view showing the clip shown in FIG. 1.
Figure 3:
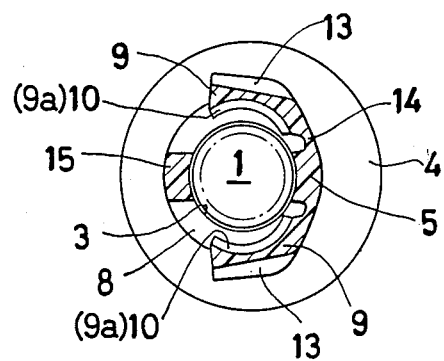
FIG. 3 is a sectional view taken along line III—III in FIG. 2.
Figure 4:
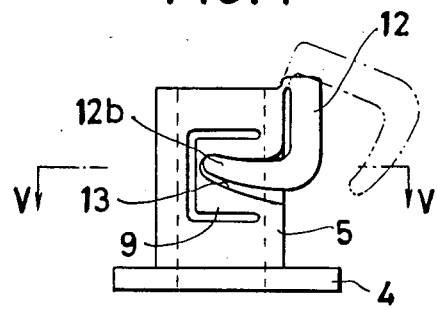
FIG. 4 is a side view showing the clip with its bifurcated pivotable member rocked downwards.
Figure 5:
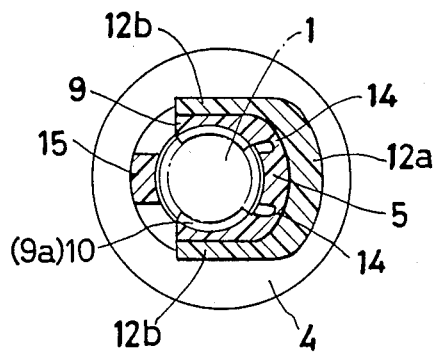
FIG. 5 is a sectional view taken along line V—V in FIG. 4.

The Figures show an embodiment of the plastic clip according to the invention. Reference numeral 1 designates a bolt, and numeral 2 designates a clip.

The clip 2 has a base 4 having a through hole 3, through which the bolt 1 is passed, an upright post 5 having a sector-shaped sectional profile and extending upright from the top of the base 4 adjacent to the through hole 3 and a cylindrical portion 6 secured to the top of the upright post 5. The cylindrical portion 6 has a hole 7 coaxial with the through hole 3 in the base 4, so that the bolt 1 can be received in the hole 7.

The through hole 3 in the base 4 and hole 7 in the cylindrical portion 6 need not be circular in shape and may, for example, be rectangular.

The base 4 has an annular ridge-like portion 8 surrounding the through hole 3 and having the same outer shape as the cylindrical portion 6. The upright post 5 extends upright from the ridge-like portion 8.

Curved flexible arms 9 extend from the opposite sides of the upright post 5. Each flexible arm 9 has a curved concave inner surface 9a which is slightly spaced apart from the outer periphery of the bolt 1. All or part of the concave inner surface 9a is formed with a thread 10 to be meshed with the male thread of the bolt 1. The convex outer surface of the flexible arm 9 projects slightly outward from the outer periphery of the cylindrical portion 6 and ridge-like portion 8.

A bifurcated pivotable member 12 is vertically pivotably united via a reduced thickness hinge portion 11 to the upper end of the cylindrical portion 6 upwardly extending from the upright post 5. The bifurcated pivotable member 12, when it is rocked downwards, causes inward flexing of the flexible arms 9 with its two leg portions 12b to mesh the threads 10 on the concave surfaces 9a of the arms 9 with the bolt 1. The bifurcated pivotable member 12 has a stem portion 12a for overlapping the outer periphery of the cylindrical portion 6 when it is rocked downwards and opposite side leg portions 12b extending from the end of and substantially perpendicular to the stem portion 12a and to urge the flexible arms 9 inwardly from the outer side thereof. The outer surface of each flexible arm 9 is formed with a retaining groove 13 for receiving each leg portion 12b of the bifurcated pivotable member 12. This clip is fabricated as a one-piece molding of a plastic material.

In the use of this plastic clip 2, the bolt 1 is welded to the floor panel of a vehicle body such that it projects upright, then a carpet is laid on the floor panel by fitting a hole thereof on the bolt 1, and a portion of the carpet surrounding the hole is urged against the floor panel by tightening the clip 2 against the bolt 1. To this end, the through hole 3 of the base 4 and hole 7 of the cylindrical portion 6 are fitted on the bolt 1 from above, and the carpet is urged against the floor panel with the lower surface of the base 4. This operation can be effected by merely urging the carpet against the floor panel, for the flexible arms 9 project outwardly as noted before and their threads 10 are not in contact with the bolt 1.

After the carpet has been held against the floor panel with the bottom surface of the base 4 of the clip 2, the bifurcated pivotable member 12 is rocked downwards. As a result, the leg portions 12b of the member 12 are brought into frictional engagement with the retaining grooves 13 formed in the outer surface of the flexible arms 9, thus causing inward flexing of the flexible arms 9. The threads 10 formed on the inwardly flexed flexible arms 9 are thus meshed with the male thread of the bolt 1, while the leg portions 12b are retained in the retaining grooves 13. The bifurcated pivotable member 12 is thus held in its downwardly locked state.

In this way, the carpet is held urged against the floor panel by the bottom surface of the base 4.

For removing the carpet, the bifurcated pivotable member 12 is rocked upwards to disengage the leg portions 12b from the grooves 13. As a result, each flexible arm 9 is outwardly flexed by its own elasticity so that the thread 10 is separated from the bolt 1. Thus, the clip 2 can be removed upwards from the bolt 1, and then the carpet can be removed.

In this embodiment, the pair of flexible arms 9 are united via respective reduced thickness hinge portions 14 to the upright post 5 so that they can be readily inwardly flexed by the bifurcated pivotable member 12. Further, an auxiliary upright post 15 facing the upright post 5 is provided between the top surface of the ridge-like portion 8 and the bottom surface of the cylindrical portion 6 to reinforce the rigidity of the upright post 5. The auxiliary upright post 15, however, may be omitted if the upright post 5 has sufficient rigidity.

Further, the hole 7 of the cylindrical portion 6 may be open at the top as well. However, it is suitably a blind hole closed at the top so that the upper end of the bolt 1 can be concealed.

While the above description of the embodiment relates to a clip according to the invention used for urging a carpet against a floor panel of a vehicle body by tightening it against a bolt projecting upright from the floor panel, this application is by no means limiting. For example, it is possible to use the clip according to the invention instead for securing an insulator to a dashboard or to a panel in the engine room, or for securing a pipe, a harness, a harness protector, etc. inside the engine room or passenger compartment, as well as for various other purposes.

With the clip according to the invention, after fitting it on a bolt the bifurcated pivotable member is rocked downwards to cause inward flexing of the flexible arms so as to mesh the threads thereof sidewise with the male thread of the bolt. Therefore, the clip can be readily tightened against the bolt without meeting any resistance. In addition, the clip can be readily removed from the bolt for re-use by a one-touch operation.

What is claimed is:

1. A plastic clip to be tightened against a bolt, comprising a base having a through hole to be penetrated vertically by said bolt, an upright post extending upright from the top of said base adjacent to said through hole, a cylindrical portion united to the outer end of said upright post and having a hole formed above and coaxial with said through hole in said base for receiving said bolt, a pair of flexible arms one extending in a curved fashion from each side of said upright post between said base and said cylindrical portion to slightly project with respect to the outer shape of said cylindrical portion and having a curved concave inner surface provided with a thread to be meshed with the male thread of said bolt, and a bifurcated pivotable member vertically rockably united via a reduced thickness hinge portion to the outer periphery of said cylindrical member, said bifurcated pivotable member serving to urge said pair of flexible arms sidewise against said bolt when rocked downwards.

2. The plastic clip according to claim 1, wherein the outer surface of each of the pair of flexible arms is formed with a retaining groove for retaining said downwardly rocked bifurcated pivotable member.

* * * * *